(12) United States Patent
Sakuma

(10) Patent No.: US 11,553,635 B2
(45) Date of Patent: Jan. 17, 2023

(54) WORK VEHICLE HAVING A CONTROL UNIT

(71) Applicant: Iseki & Co., LTD, Ehime-ken (JP)

(72) Inventor: Daisuke Sakuma, Ehime-ken (JP)

(73) Assignee: ISEKI & CO., LTD., Matsuyama (JP)

( * ) Notice: Subject to any disclaimer, the term of this patent is extended or adjusted under 35 U.S.C. 154(b) by 509 days.

(21) Appl. No.: 16/713,134

(22) Filed: Dec. 13, 2019

(65) Prior Publication Data

US 2020/0205335 A1    Jul. 2, 2020

(30) Foreign Application Priority Data

Dec. 27, 2018  (JP) .............................. JP2018-246236

(51) Int. Cl.
*A01B 63/111*  (2006.01)
*G05D 1/00*  (2006.01)

(52) U.S. Cl.
CPC .......... *A01B 63/111* (2013.01); *G05D 1/0088* (2013.01); *G05D 2201/0201* (2013.01)

(58) Field of Classification Search
CPC . A01B 59/066; A01B 63/111; A01B 63/1112; A01B 71/02; G05D 1/0088; G05D 2201/0201
See application file for complete search history.

(56) References Cited

U.S. PATENT DOCUMENTS

| | | | |
|---|---|---|---|
| 2018/0181143 A1* | 6/2018 | Hiramatsu | G05D 1/0295 |
| 2019/0177953 A1* | 6/2019 | Takahashi | E02F 9/22 |
| 2020/0029484 A1* | 1/2020 | Weidenbach | A01G 25/09 |
| 2020/0201347 A1* | 6/2020 | Dalfra | G05D 1/027 |

FOREIGN PATENT DOCUMENTS

JP    2015-191592 A    11/2015

* cited by examiner

*Primary Examiner* — Behrang Badii
*Assistant Examiner* — Matthew J. Reda
(74) *Attorney, Agent, or Firm* — Finnegan, Henderson, Farabow, Garrett & Dunner LLP

(57) ABSTRACT

A work vehicle includes a travelling vehicle body; a work machine mounted on a rear portion of the travelling vehicle body to be capable of being lifted and lowered; a control unit for controlling lifting and lowering of the work machine; and a rear sensor provided on the rear portion of the travelling vehicle body and configured to detect an object present behind the travelling vehicle body. The control unit may be configured to set a regulation height based on a height where the rear sensor detects the work machine while the work machine is lifted and then regulate lifting of the work machine during work in such a manner that a height of the work machine is kept less than or equal to the regulation height.

16 Claims, 14 Drawing Sheets

FRONT ←⎯⎯⎯⎯→ REAR

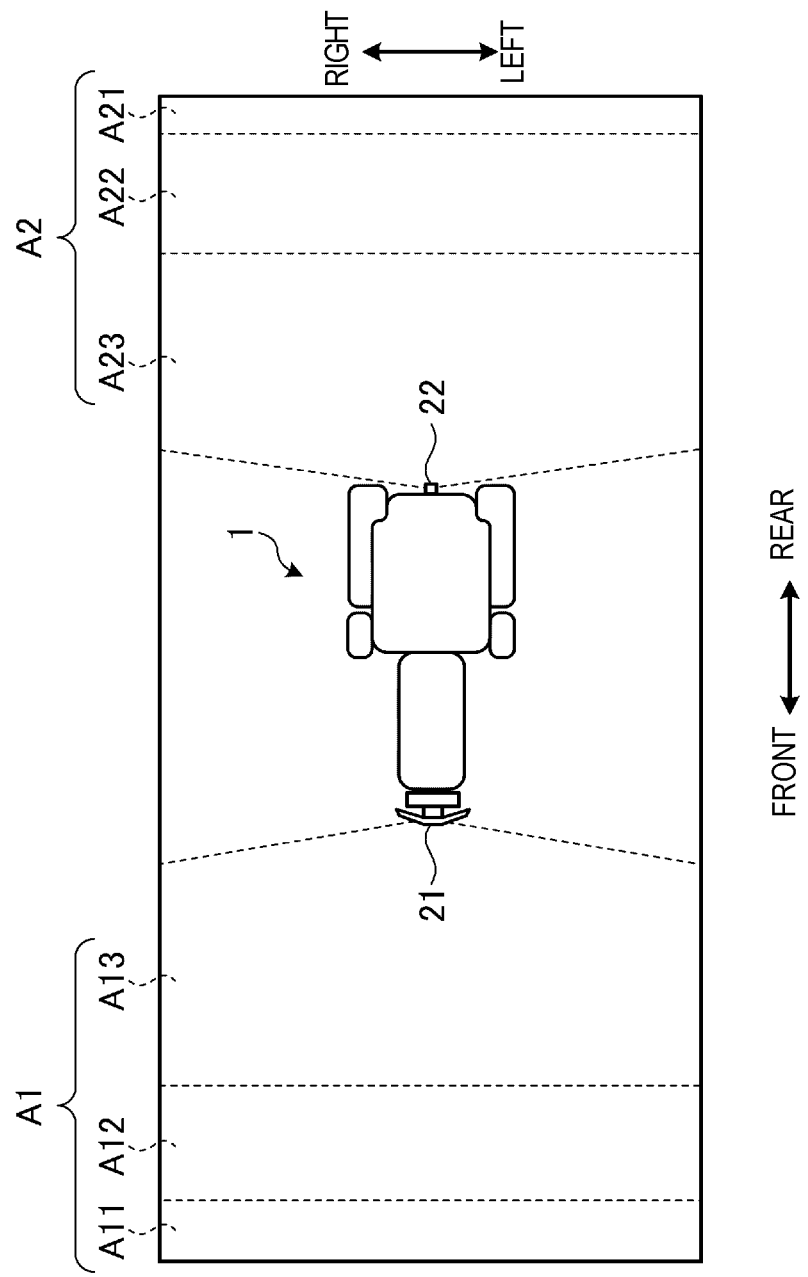

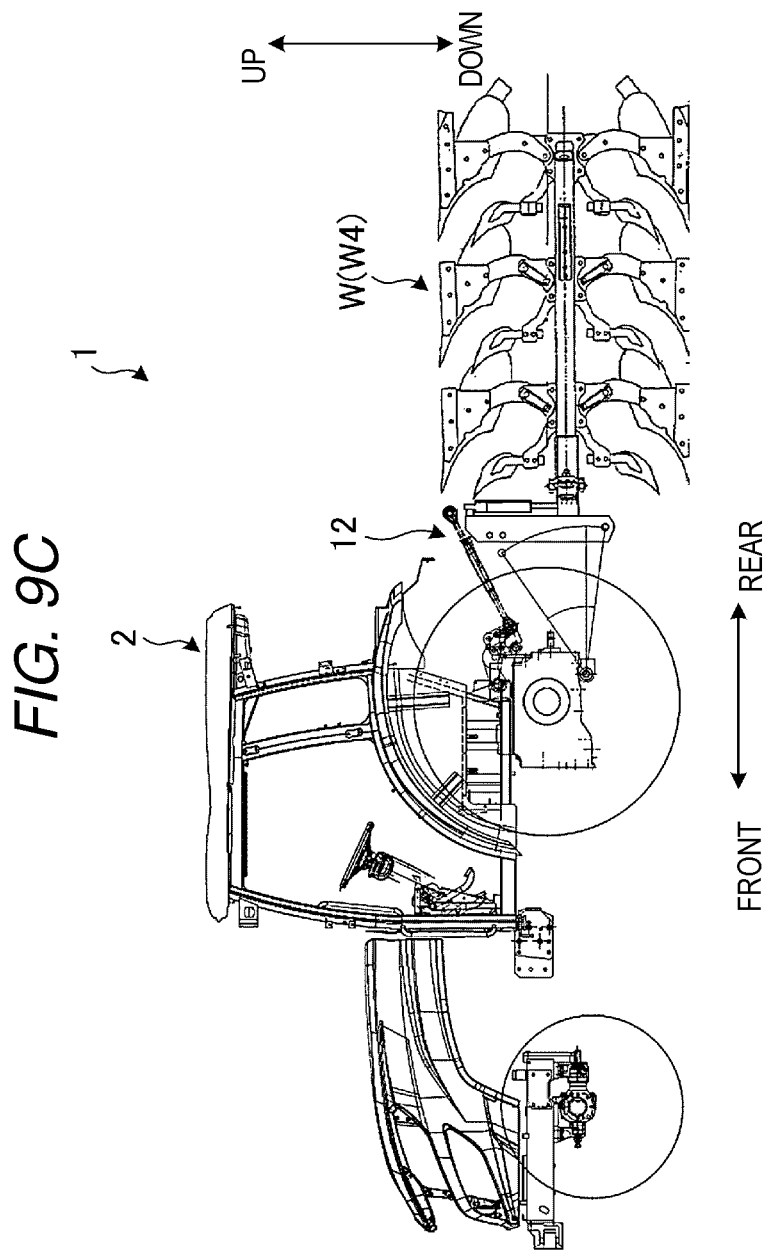

WORK VEHICLE HAVING A CONTROL UNIT

CROSS REFERENCE TO RELATED APPLICATIONS

This application claims priority to Japanese Patent Application No. 2018-246236, filed Dec. 27, 2018, the disclosure of which is incorporated herein by reference in its entirety.

BACKGROUND

The present disclosure relates to a work vehicle.

Conventionally, in the field of work vehicles (e.g., agricultural tractors), there is known a work vehicle having a positioning device mounted on a machine body and that can autonomously travel while measuring a position of the machine body. Also, there is known a work vehicle that can autonomously travel, which has an obstacle sensor for detecting an obstacle and a sensitivity adjusting means for adjusting a sensitivity of the obstacle sensor (e.g., see JP-A-2015-191592). In this case, the sensitivity of the obstacle sensor is adjusted to be high inside a set work area and to be low outside the set work area, thereby preventing an object that is not associated with the work from being detected as an obstacle (mis-detecting).

SUMMARY

Here, work vehicles, such as agricultural tractors, are likely to have a work machine mounted on a rear portion of the machine body to be capable of being lifted and lowered. However, in the conventional work vehicles as described above, there is a possibility that a rear sensor for monitoring the environment behind the machine body mis-detects the work machine as an obstacle and thus work efficiency thereof decreases.

The present disclosure has been made keeping in mind the above problems, and an object thereof may be to provide a work vehicle in which a decrease in work efficiency is prevented.

In order to address the problems as described above and also to achieve the object, a work vehicle according to a first aspect of the disclosure may be provided. The work vehicle may include a travelling vehicle body; a work machine mounted on a rear portion of the travelling vehicle body to be capable of being lifted and lowered; a control unit for controlling lifting and lowering of the work machine; a rear sensor provided on the rear portion of the travelling vehicle body and configured to detect an object present behind the travelling vehicle body; and a control unit configured to set a regulation height based on a height where the rear sensor detects the work machine while the work machine is lifted and then to regulate lifting of the work machine during work in such a manner that a height of the work machine is kept equal to or lower than the regulation height.

A work vehicle according to a second aspect of the disclosure may be the work vehicle according to the first aspect, in which the control unit is configured to set the regulation height based on results of detection by the rear sensor which are obtained by performing trial lifting of the work machine a plurality of times.

A work vehicle according to a third aspect of the disclosure may be the work vehicle according to the second aspect, in which the control unit is configured to stop setting the regulation height if there are variations beyond a predetermined range in the results of detection by the rear sensor which are obtained by performing trial lifting of the work machine the plurality of times.

A work vehicle according to a fourth aspect of the disclosure may be the work vehicle according to any one of the first to third aspects, which further includes a lift arm provided on the rear portion of the travelling vehicle body and configured to lift and lower the work machine by pivoting about a fulcrum; and a lift arm sensor for detecting a pivot angle of the lift arm about the fulcrum, in which the control unit is configured to control the pivot angle of the lift arm based on results of detection by the lift arm sensor in order to lift and lower the work machine.

According to the first aspect, it may be possible to regulate lifting of the work machine during work in such a manner that the work machine is not lifted up to a height where the work machine is mis-detected as an obstacle, thereby ensuring that the work can be smoothly performed. As a result, a decrease in work efficiency can be prevented.

During setting of the regulation height of the work machine, the regulation height may be mis-set if the rear sensor detects an obstacle due to any causes other than detection of the work machine. Therefore, in addition to the effects of the first aspect, according to the second aspect, it may be possible to prevent the regulation height from being mis-set by lifting the work machine the plurality of times.

During setting of the regulation height of the work machine, if there are variations in the results of detection by the rear sensor obtained by lifting the work machine a plurality of times, there is a high possibility that the rear sensor detects an obstacle due to any causes other than detection of the work machine. Therefore, in addition to the effects of the second aspect, according to the third aspect, it may be possible to stop setting the regulation height of the work machine in such a case, thereby preventing mis-setting of the regulation height.

In addition to the effects of the first to third aspects, according to the fourth aspect, it may be possible to easily achieve control of lifting of the work machine.

Objects and advantages of the disclosed embodiments may be realized and attained by the elements and combinations that may be set forth in the claims. However, embodiments of the present disclosure are not necessarily required to achieve such exemplary objects and advantages, and some embodiments may not achieve any of the objects and advantages discussed above.

BRIEF DESCRIPTION OF THE DRAWINGS

FIG. 6 is an explanatory view of a detection sensitivity of the front sensor and the rear sensor;

FIG. 9C is an explanatory view of another type of work machine (Part 3);

DESCRIPTION OF EMBODIMENTS

Now, embodiments of a work vehicle will be described in detail with reference to the accompanying drawings. Meanwhile, the present invention is not limited to the embodiments as described below.

First Embodiment

<General Configuration of Work Vehicle (Tractor) 1>

Figure 1:
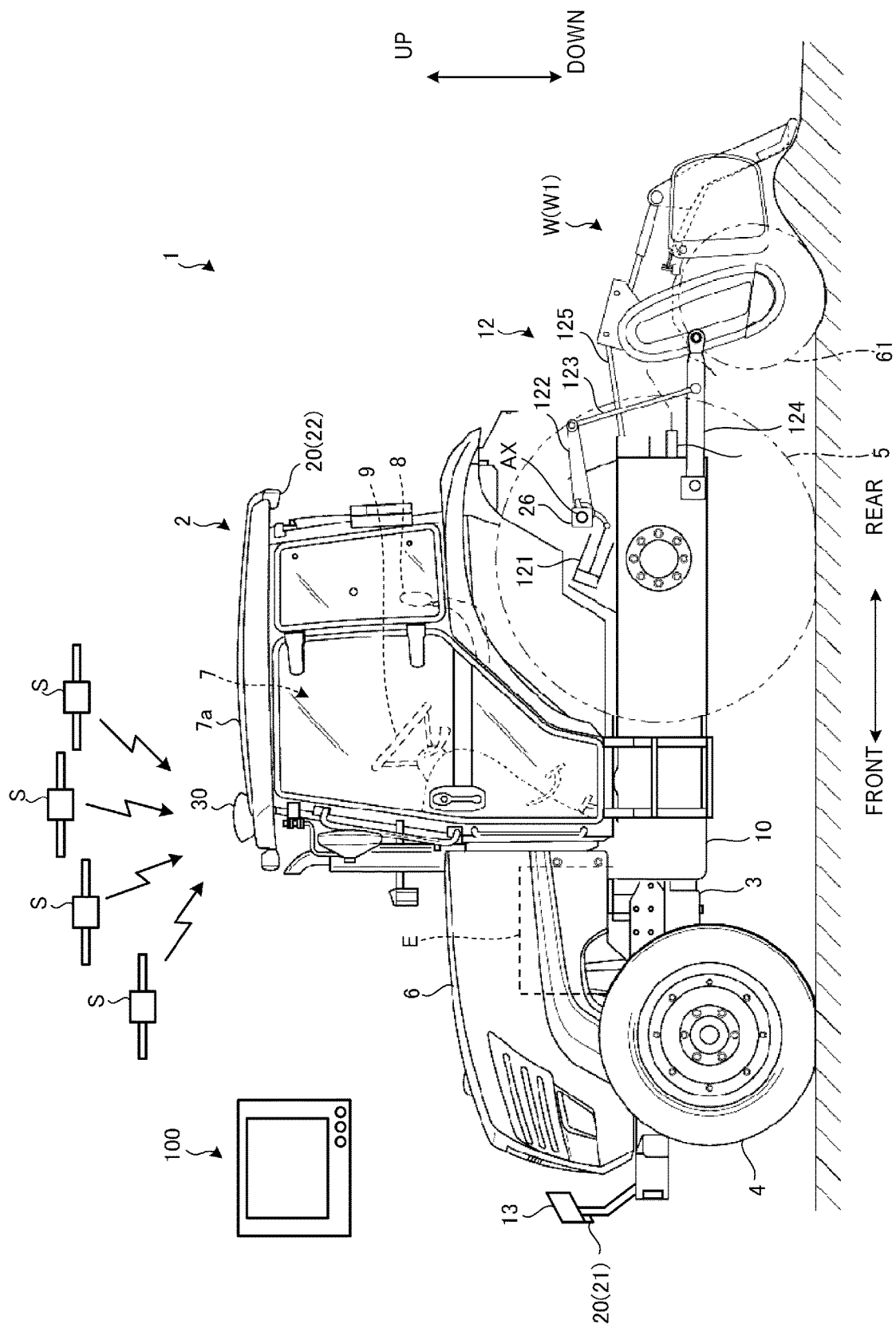
FIG. 1 is an explanatory view of a work vehicle according to a first embodiment.

First, a general configuration of a work vehicle according to a first embodiment will be described with reference to FIG. 1. FIG. 1 is an explanatory view of the work vehicle (e.g., a tractor) according to a first embodiment, corresponding to a schematic left side view of the work vehicle. In the following description, a tractor 1 will be described as an example of the work vehicle.

The tractor 1, which is an example of the work vehicle, is an agricultural tractor which is intended to perform work on a farm field or the like while being self-propelled. Also, the tractor 1 can perform a predetermined work operation while travelling in a farm field with an operator (also referred to as a worker) riding thereon, and also can perform a predetermined work operation while automatically travelling in a farm field by controlling each of its parts using a controller or control system centering on a control unit 40 (see FIG. 2) as described below.

Further, in the following description, a front and rear direction may refer to a travelling direction of the tractor 1 during straight travel, where a front side of the travelling direction is defined as "front" and a rear side thereof is defined as "rear". The travelling direction of the tractor 1 may be a direction from an operator seat 8 (as described below) toward a steering wheel 9 during straight travel (see FIG. 1).

A left and right direction may be a direction horizontally perpendicular to the front and rear direction. In the following description, left and right may be defined with respect to the "front" side. That is, in a state where an operator (also referred to as a worker) of the tractor 1 sits on the operator seat 8 and faces the front side, the left hand side is defined as "left" and the right hand side is defined as "right".

An upward and downward direction may be a vertical direction. The front and rear direction, the left and right direction and the upward and downward direction are perpendicular to each other. Meanwhile, the directions are defined for the sake of convenience of explanation, and accordingly, the present invention is not limited to such directions. Further, in the following description, the tractor 1 may also be referred to as a "machine body".

As shown in FIG. 1, the tractor 1 includes a travelling vehicle body 2 and a work machine W. The travelling vehicle body 2 has a vehicle body frame 3, front wheels 4, rear wheels 5, a bonnet 6, an engine E, a cockpit 7 and a transmission case 10. The vehicle body frame 3 is a main frame of the travelling vehicle body 2.

The front wheels 4 include a pair of left and right wheels and may be wheels used for steering (steered wheels). The rear wheels 5 include a pair of left and right wheels and may be wheels used for driving (driven wheels). The tractor 1 may be configured to be convertible between a two-wheel drive (2WD), in which the rear wheels 5 are driven, and a four-wheel drive (4WD), in which both the front wheels 4 and the rear wheels 5 are driven. In some embodiments, both the front wheels 4 and the rear wheels 5 are driven wheels. Alternatively, the travelling vehicle body 2 may have crawler devices, instead of the wheels (front wheels 4 and rear wheels 5). In this case, a travelling crawler is a driven wheel.

The bonnet 6 is provided on a front portion of the travelling vehicle body 2 to be opened and closed. The bonnet 6 can be pivoted (e.g., opened and closed) about a rear portion thereof as a pivot center in the upward and downward direction. Also, in the closed state, the bonnet 6 covers the engine E mounted on the vehicle body frame 3. The engine E is a driving source for the tractor 1 and a heat engine, such as a diesel engine or a gasoline engine.

The cockpit 7 is provided on an upper portion of the travelling vehicle body 2 and includes the operator seat 8, the steering wheel 9 and the like. The cockpit 7 may be formed to be covered with a cabin 7a provided on the top of the travelling vehicle body 2. The operator seat 8 is a seat for an operator. The steering wheel 9 is operated by the operator when steering the front wheels 4, which are steered wheels. In addition, the cockpit 7 has a display unit (e.g., meter panel) for displaying various information in front of the steering wheel 9.

Further, the cockpit 7 includes various operation levers, such as a forward/reverse lever, an accelerator lever, a main shift lever and a sub-shift lever, and various operation pedals, such as an accelerator pedal, a brake pedal and a clutch pedal.

The transmission case 10 houses a transmission (e.g., a speed-changing mechanism) therein. The transmission is configured to properly reduce a speed of a power (e.g., rotational power) transferred from the engine E and then to transfer the power to the rear wheels 5, which are driven wheels, or to a PTO (Power Take-off) shaft 11 as described below.

The work machine W for performing work in a farm field is connected to a rear portion of the travelling vehicle body 2. The PTO shaft 11 for transmitting power to the work machine W to drive the work machine W protrudes rearward from the transmission case 10. The PTO shaft 11 is configured to transmit the rotational power, of which a speed is properly reduced by the transmission, to the work machine W mounted on at least the rear portion of the travelling vehicle body 2.

In addition, a lifting device 12 for lifting and lowering the work machine W is provided on the rear portion of the travelling vehicle body 2. The lifting device 12 can move the work machine W to a non-working position by lifting the work machine W. Also, the lifting device 12 can move the work machine W to a working position by lowering the work machine W. The lifting device 12 includes a hydraulic lifting cylinder 121, a lift arm 122, a lift rod 123, a lower link 124 and a top link 125.

If a hydraulic fluid is supplied to the lifting cylinder 121, the lift arm 122 can be pivoted about an axis AX, which serves as a pivot fulcrum, in order to lift the work machine W. On the other hand, if the hydraulic fluid is discharged from the lifting cylinder 121, the lift arm 122 can be pivoted about the axis AX to lower the work machine W. In addition, a lift arm sensor 26 for detecting a pivot angle of the lift arm 122 is provided on a base portion of the lift arm 122 (on the vicinity of the axis AX). A height of the work machine W may be calculated based on a result detected by the lift arm sensor 26.

Further, the lift arm 122 is connected to the lower link 124 via the lift rod 123. In this way, the lifting device 12 connects the work machine W to the travelling vehicle body 2 via the lower link 124 and the top link 125, thereby allowing the work machine W to be lifted and lowered.

The work machine W is a machine for performing work in a farm field. In the example shown in FIG. 1, the work machine W is a rotary tiller W1 for performing tillage work in a farm field. The rotary tiller W1 is configured to till a farm field surface (e.g., soil) by means of a tilling claw 61 rotated by power transmitted from the PTO shaft 11 thereto. Meanwhile, other types of work machine W will be described with reference to FIGS. 9A to 9C.

Figure 2:
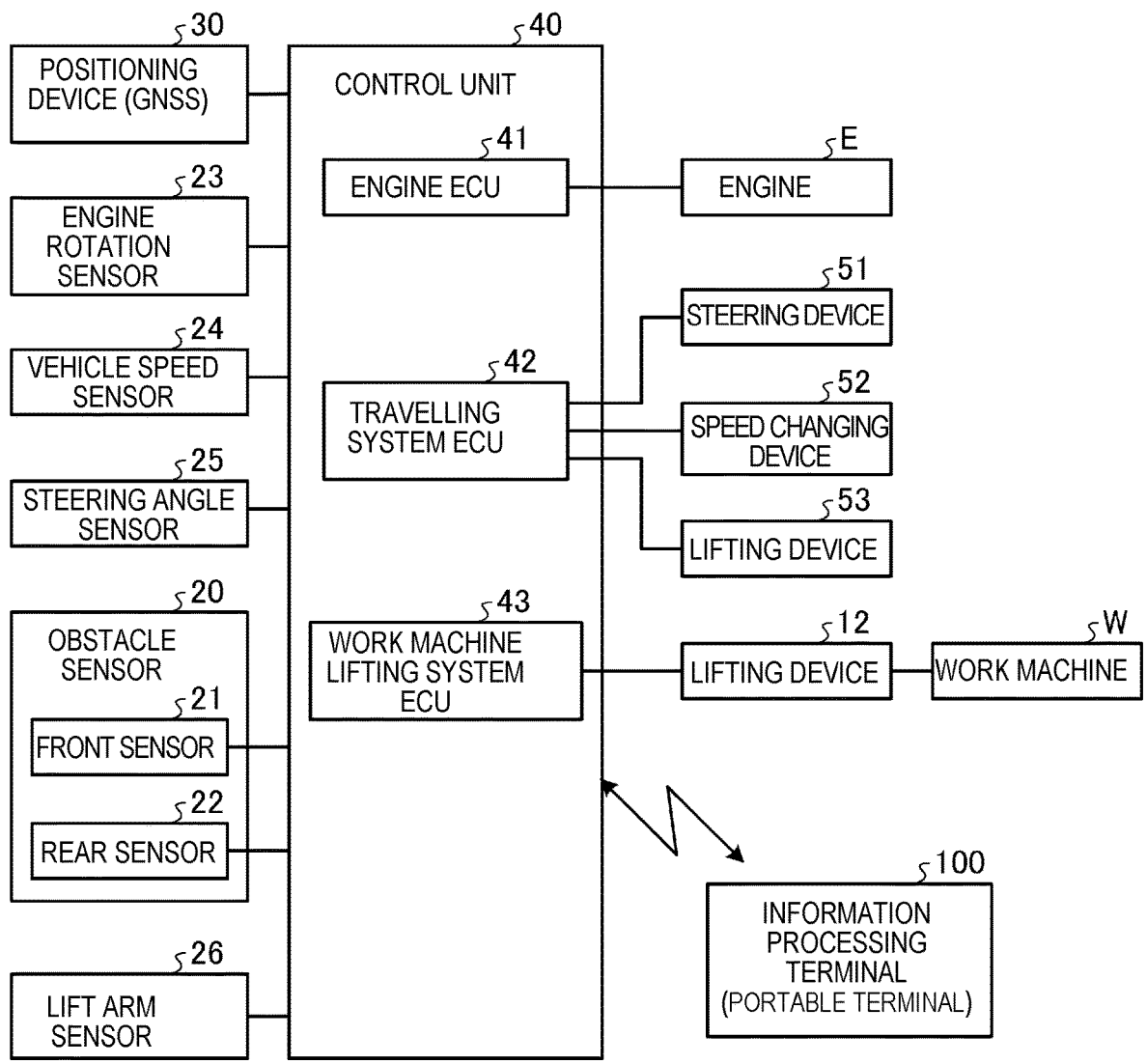
FIG. 2 is a block diagram showing an example of a control system including detection of an obstacle.

Further, the tractor 1 includes the control unit 40 (see FIG. 2). The control unit 40 is configured to control the engine E and also to control a travelling speed of the travelling vehicle body 2. In addition, the control unit 40 controls the work machine W.

Further, the tractor 1 has a positioning device 30. The positioning device 30 is provided on the upper portion of the travelling vehicle body 2 and is configured to measure a position of the travelling vehicle body 2. The positioning device 30 is, for example, a GNSS (Global Navigation Satellite System) and can perform positioning and timing by receiving radio waves from a navigation satellite S orbiting in the sky (see FIG. 1).

Also, the tractor 1 can be configured to allow various work in a specific farm field to be set or the like by operation of an information processing terminal (e.g., a portable terminal, such as a tablet terminal) 100 by a worker. The information processing terminal 100 includes a storage unit, which is constituted of, for example, a hard disk, ROM (Read Only Memory), RAM (Random Access Memory) and the like, and a display unit and an operation unit, which are constituted of a touch panel. Alternatively, various key, buttons or the like may be additionally provided as the operation unit.

Further, the tractor 1 has an obstacle sensor 20. The obstacle sensor 20 includes a front sensor 21 and a rear sensor 22. The front sensor 21 is arranged on the front portion of the travelling vehicle body 2, such as by attaching the front sensor 21 to a sensor attaching stay 13 provided in front of the bonnet 6, and is configured to detect an object (e.g., an obstacle) present in front of the travelling vehicle body 2. The rear sensor 22 is arranged on the rear upper portion of the travelling vehicle body 2, such as by attaching the rear sensor 22 on the top of the cabin 7a, and is configured to detect an object (e.g., an obstacle) present behind the travelling vehicle body 2.

Also, both the front sensor 21 and the rear sensor 22 are a medium distance sensor. Each of the front sensor 21 and the rear sensor 22 may be an infrared sensor. An infrared sensor may be configured to emit an infrared beam and then to receive a reflected beam from an obstacle.

The front sensor 21 and the rear sensor 22 may be configured to detect a distance to the obstacle, for example, by measuring a time until the reflected beam from the obstacle is detected after emitting the infrared beam. The front sensor 21 and the rear sensor 22, which are the infrared sensors, detect an obstacle two-dimensionally and have, for example, a detection range of several meters to several tens of meters. In some embodiments, a medium distance sensor other than an infrared sensor may be used as the obstacle sensor 20.

<Control System of Work Vehicle (Tractor) 1>

Next, a controller or control system of the work vehicle (tractor) 1, which centers on the control unit 40, will be described with reference to FIG. 2. FIG. 2 is a block diagram showing an example of the controller or control system, which may be used for, for example, detecting an obstacle. As shown in FIG. 2, the control unit 40 includes an engine ECU (Electronic Control Unit) 41, a travelling system ECU 42 and a work machine lifting system ECU 43. The engine ECU 41 is configured to control a rotation speed of the engine E. The travelling system ECU 42 is configured to control a travelling speed of the travelling vehicle body 2 (see FIG. 1) by controlling rotation of the driven wheels. The work machine lifting system ECU 43 is configured to control lifting and lowering of the work machine W by controlling the lifting device 12.

The control unit 40 can electronically control various parts and includes a processing unit, such as a CPU (Central Processing Unit), a storage unit for storing therein various programs and necessary data, such as planned travelling routes R (as described below; see FIG. 12) of the travelling vehicle body 2, which are previously set for each of farm fields, and the like. An electronic control unit included in the control unit 40 may be programmed to implement various functions.

As shown in FIG. 2, various sensors, including the positioning device (GNSS) 30, an engine rotation sensor 23, a vehicle speed sensor 24, a steering angle sensor 25, the obstacle sensor 20 (front sensor 21 and rear sensor 22) and the lift arm sensor 26, are connected to the control unit 40. Meanwhile, the engine rotation sensor 23 is configured to detect a rotation speed of the engine E. The vehicle speed sensor 24 is configured to detect a travelling speed (vehicle speed) of the travelling vehicle body 2 (see FIG. 1). The steering angle sensor 25 is configured to detect a steering angle of the front wheels 4 (see FIG. 1), which are the steered wheels. The steering angle sensor 25 detects turning of the machine body.

Information about the position of the travelling vehicle body 2 in a farm field or the like from the positioning device 30, a rotation speed of the engine E from the engine rotation sensor 23, a travelling speed of the travelling vehicle body 2 from the vehicle speed sensor 24 and a steering angle of the front wheels 4 from the steering angle sensor 25 are input to the control unit 40. In a case where the tractor 1 is caused to autonomously travel, the control unit 40 can automatically steer the steering wheel 9 by controlling a steering cylinder connected to the steering wheel 9 while providing feedback on the steering angle of the steering wheel 9, using a result of detection by the steering angle sensor 25.

Also, in the control unit 40, the engine ECU 41 is connected to the engine E, the travelling system ECU 42 is connected to a steering device 51, a speed changing device 52, a brake device 53 and the like, and the work machine lifting system ECU 43 is connected to the lifting device 12. Among these, the work machine lifting system ECU 43 outputs a work machine lifting signal to the lifting device 12. The lifting device 12 drives the work machine W to be lifted or lowered based on the work machine lifting signal output from the work machine lifting system ECU 43. It will be understood that a plurality of ECUs may be implemented as a single electronic control unit or as separate computing devices, etc.

Further, the control unit 40 has an "autonomous operation mode", in which the tractor 1 performs work while autonomously travelling. In the autonomous operation mode, the control unit 40 controls various parts, including the engine E, the steering device 51, the speed changing device 52, the brake device 53 and the lifting device 12, based on measurement results of the positioning device 30, so that the tractor 1 travels along a planned travelling route R (see FIG. 12) stored in the storage unit. In this case, the planned travelling route R, which is previously defined for each of farm fields so as to correspond to work contents to be performed by the work machine W, is converted into data and then stored in the storage unit. Meanwhile, the planned travelling route R is set in accordance with shapes and sizes of the farm fields, widths, lengths and numbers of furrows formed in the farm fields, types of crops and the like.

Further, the control unit 40 is wirelessly connected to the information processing terminal (potable terminal) 100, which can be carried by a worker, for example. The control unit 40 controls various parts of the tractor 1 based on an instruction signal from the information processing terminal 100 operated by a worker. Additionally, the control unit 40 may be configured to hold a machine body information database of the tractor 1 therein, so that exchange of information on the tractor 1, such as model, can be performed from the information processing terminal 100.

<Work Machine Height Manual Designation Means 71>

Figure 3:
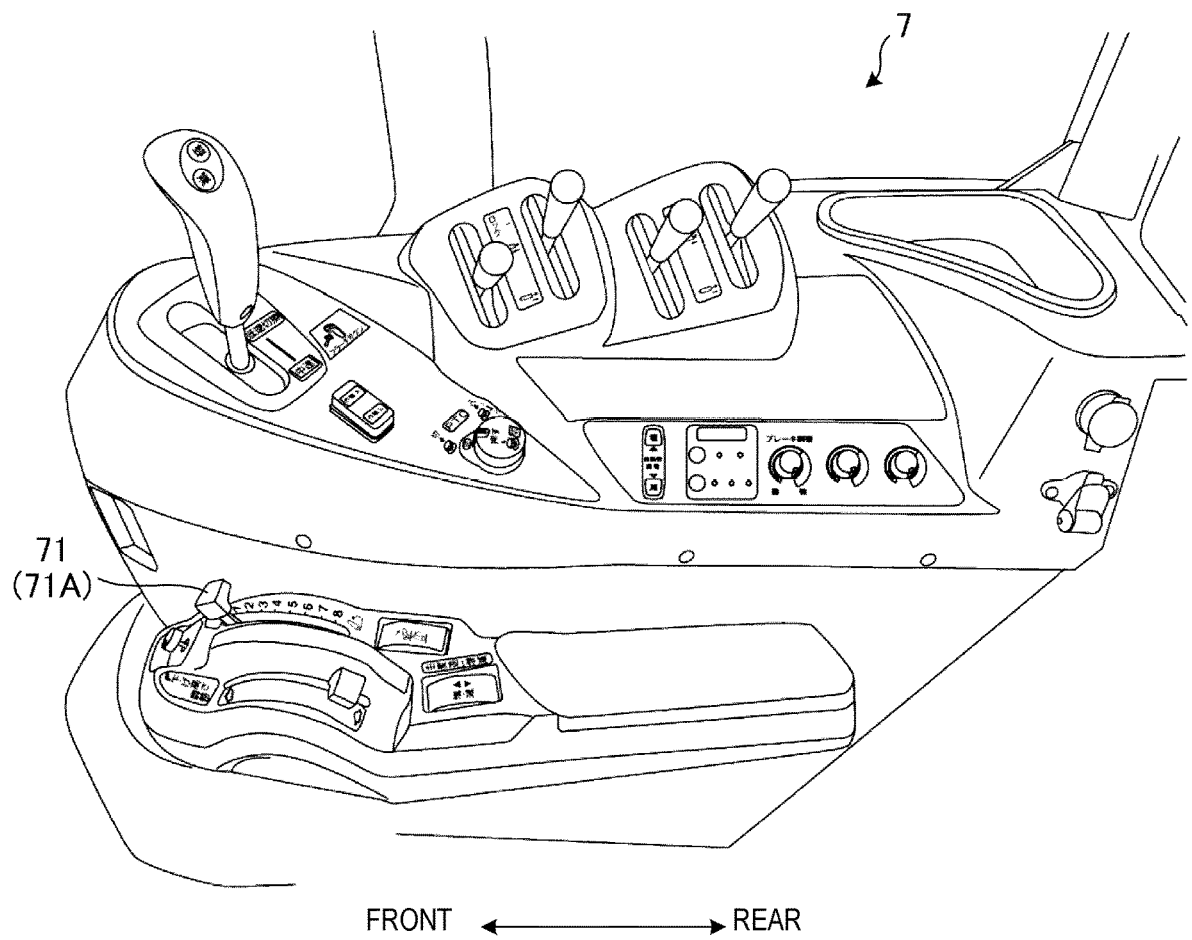
FIG. 3 is a perspective view showing a work machine height manual designation means (Part 1)
Figure 4:
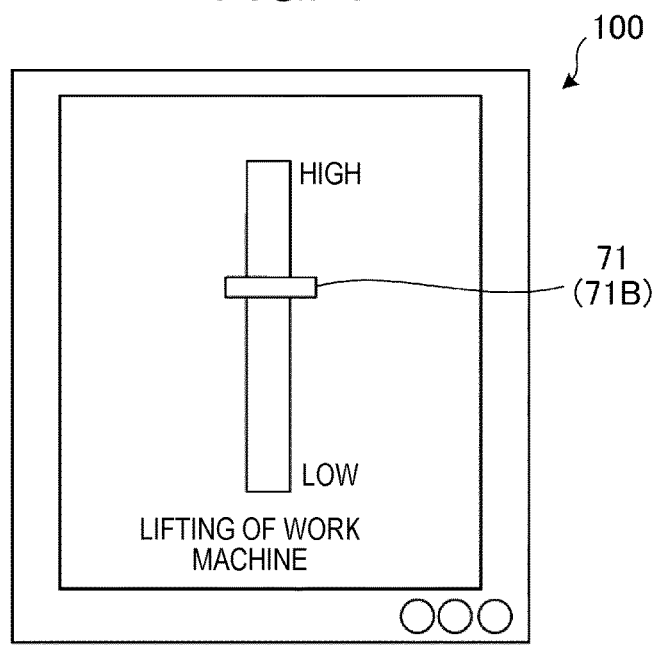
FIG. 4 is a perspective view showing the work machine height manual designation means (Part 2)

Next, a work machine height manual designation means will be described with reference to FIGS. 3 and 4. FIGS. 3 and 4 are perspective views showing a work machine height manual designation means 71 (first manual designation means 71A and second manual designation means 71B). FIG. 3 is a perspective view showing the first manual designation means 71A of the work machine height manual designation means 71. FIG. 4 is a view showing the second manual designation means 71B of the work machine height manual designation means 71.

As shown in FIG. 3, a work machine lifting lever as the first manual designation means 71A is provided on the right side of the cockpit 7, for example, the operator seat 8 (see FIG. 1). The work machine lifting lever 71A is operated when the work machine W (see FIG. 1) is lifted or lowered at a certain height via the lifting device 12 (see FIG. 1) by manual operation thereof by a worker.

As shown in FIG. 4, a work machine lifting lever image as the second manual designation means 71B is displayed on the information processing terminal 100. Like the work machine lifting lever 71A (see FIG. 3) as described above, the work machine lifting lever image 71B is operated when the work machine W (see FIG. 1) is lifted or lowered at a certain height via the lifting device 12 (see FIG. 1) by manual operation thereof by a worker.

<Detection Range of Obstacle Sensor 20>

Figure 5A:
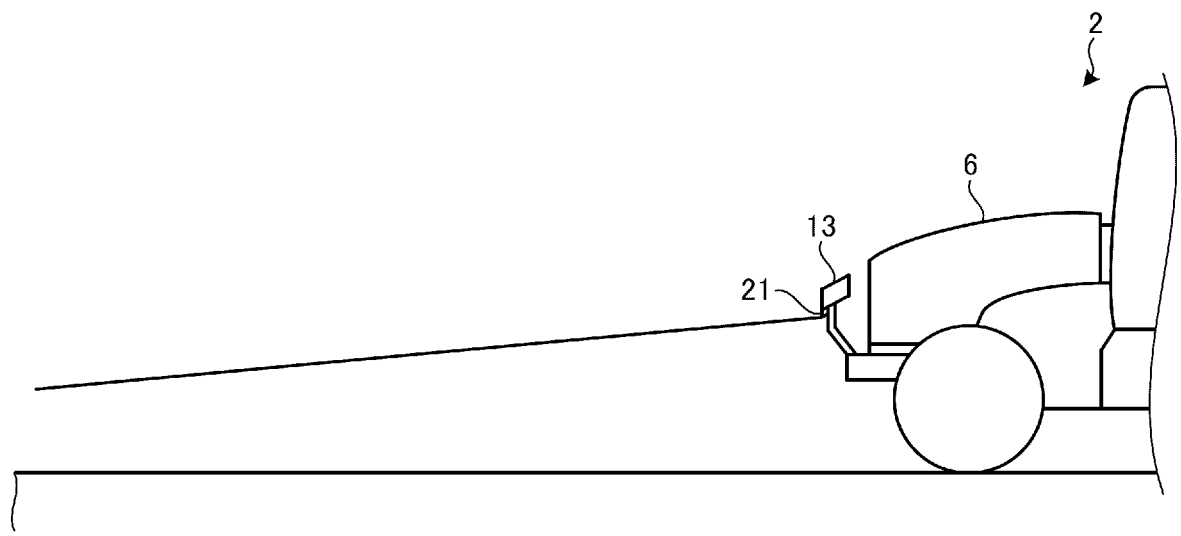
FIG. 5A is an explanatory view of a detection range of a front sensor.
Figure 5B:
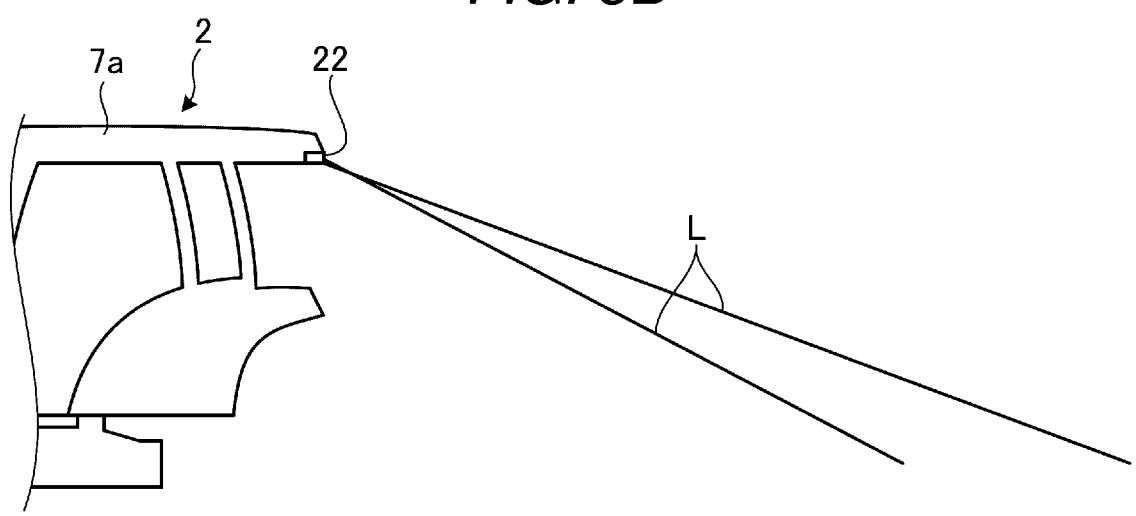
FIG. 5B is an explanatory view of a detection range of a rear sensor.

Next, the detection range of the obstacle sensor 20 (front sensor 21 and rear sensor 22) will be described with reference to FIGS. 5A and 5B. FIG. 5A is an explanatory view of the detection range of the front sensor 21, corresponding to a left side view of the travelling vehicle body 2. FIG. 5B is an explanatory view of the detection range of the rear sensor 22, corresponding to a left side view of the travelling vehicle body 2.

As shown in FIG. 5A, the front sensor 21 attached to the sensor attaching stay 13 in front of the bonnet 6 of the travelling vehicle body 2 is a medium range sensor, such as an infrared sensor, as described above, and has, for example, a detection range of several meters to several tens of meters in front of the travelling vehicle body 2.

As shown in FIG. 5B, the rear sensor 22 attached on the rear upper portion of the cabin 7a of the travelling vehicle body 2 is a medium range sensor, such as an infrared sensor, as described above, like the front sensor 21 and has, for example, a detection range of several meters to several tens of meters behind the travelling vehicle body 2. The rear sensor 22 is positioned at a location higher than the front sensor 21 and thus is configured to emit an infrared beam L at a more inclined angle than that of the front sensor 21.

<Detection Sensitivity of Obstacle Sensor 20>

Next, the obstacle sensor 20 (front sensor 21 and rear sensor 22) will be described with reference to FIG. 6. FIG. 6 is an explanatory view of a detection sensitivity of the front sensor 21 and the rear sensor 22, corresponding to a schematic plan view showing the tractor 1 and the vicinity of the tractor 1.

As shown in FIG. 6, the detection range A1 of the front sensor 21 may be divided into a plurality of ranges (e.g., three ranges), for example, along the front and rear direction. Herein, the detection range of the front sensor 21 is divided into a detection range A11, which is at the remotest distance from the tractor 1, a detection range A12, which is at the next remotest distance from the tractor 1, and a detection range A13, which is at the nearest distance from the tractor 1.

The tractor 1 is set such that a detection sensitivity in the control unit 40 (see FIG. 2) with respect to the remotest detection range A11 is lowest. Meanwhile, if an obstacle is within the detection range A11, for example, an alarm is issued.

Also, the tractor 1 is set such that a detection sensitivity in the control unit 40 with respect to the next remotest detection range A12 is higher than the detection sensitivity with respect to the detection range A11. Meanwhile, if an obstacle is within the detection range A12, for example, a vehicle speed is reduced.

Further, the tractor 1 is set such that a detection sensitivity in the control unit 40 with respect to the nearest detection range A13 is highest. Meanwhile, if an obstacle is within the detection range A13, for example, the tractor is stopped. In this way, the tractor 1 may be configured to perform different avoidance behaviors depending on distances to an obstacle.

Also, as shown in FIG. 6, like the front sensor 21, the detection range A2 of the rear sensor 22 may be divided into a plurality of ranges (e.g., three ranges), for example, along the front and rear direction. Herein, the detection range of the rear sensor 22 is divided into a detection range A21, which is at the remotest distance from the tractor 1, a detection range A22, which is at the next remotest distance from the tractor 1, and a detection range A23, which is at the nearest distance from the tractor 1.

The tractor 1 is set such that a detection sensitivity in the control unit 40 (see FIG. 2) with respect to the remotest detection range A21 is lowest. Also, the tractor 1 is set such that a detection sensitivity in the control unit 40 with respect to the next remotest detection range A22 is higher than the detection sensitivity with respect to the detection range A21. Further, the tractor 1 is set such that a detection sensitivity in the control unit 40 with respect to the nearest detection range A23 is highest.

<Setting of Regulation Height of Work Machine W>

Figure 7A:
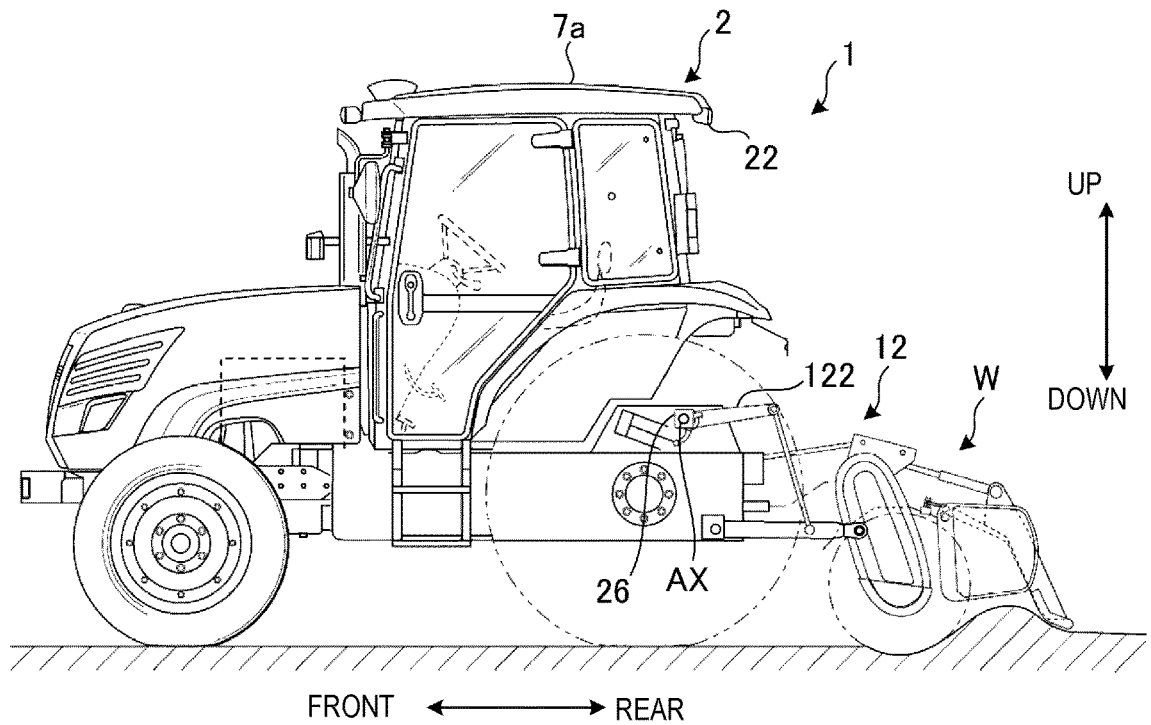
FIG. 7A is an explanatory view of setting a regulation height of the work machine (Part 1)
Figure 7B:
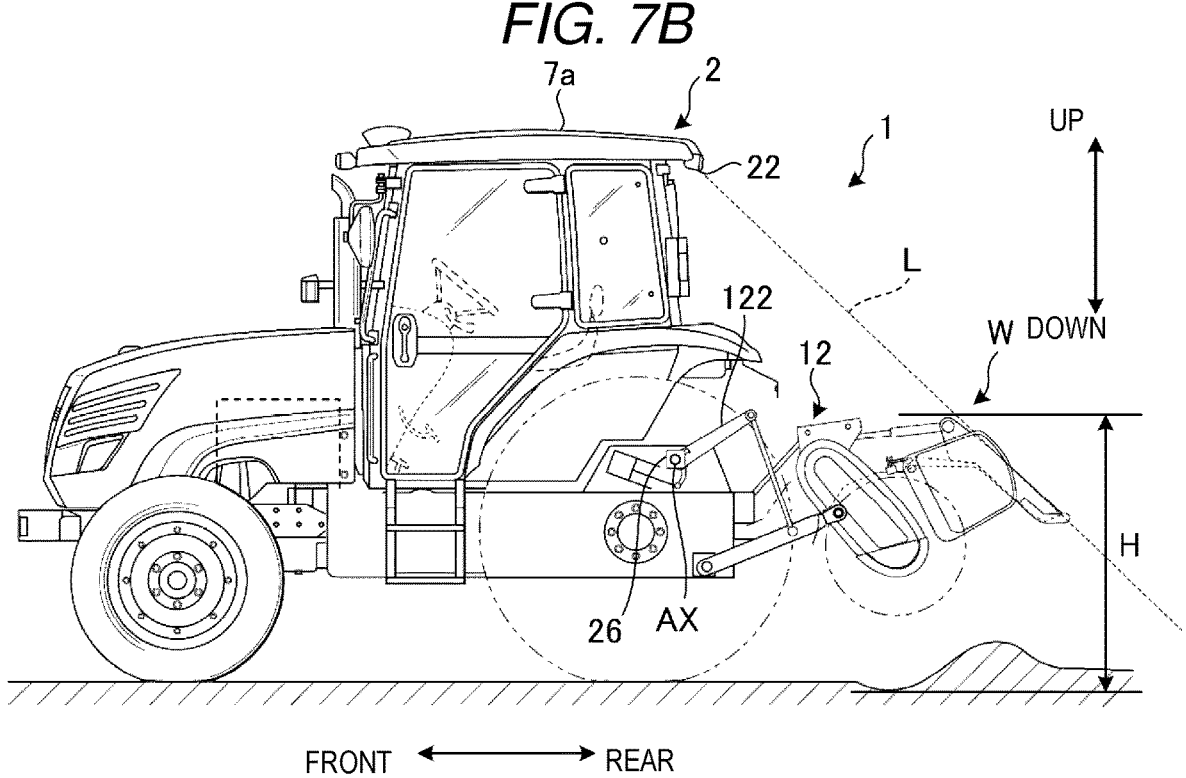
FIG. 7B is an explanatory view of setting a regulation height of the work machine (Part 2)

Next, setting of a regulation height of the work machine W will be described with reference to FIGS. 7A and 7B. FIGS. 7A and 7B are explanatory views of setting of the regulation height of the work machine W. FIG. 7A shows a state before the regulation height of the work machine W is set, and FIG. 7B shows a state where the regulation height of the work machine W is being set. In the tractor 1, in order to prevent the work machine W from entering the detection range of the rear sensor 22 and thus, for example, to prevent the tractor 1 from stopping, the control unit 40 (see FIG. 2) executes a control for preventing the work machine W from entering the detection range of the rear sensor 22.

As shown in FIGS. 7A and 7B, the control unit 40 lifts the work machine W in order to set the regulation height of the work machine W. In this case, the control unit 40 controls a pivot angle of the lift arm 122 pivoted about the axis AX, which serves as a fulcrum, based on a result of detection by the lift arm sensor 26, thereby lifting or lowering the work machine W. Also, the control unit 40 lifts the work machine W and also stores as a regulation height H a height where the rear sensor 22 detects the work machine W while the work machine W is lifted. The rear sensor 22 detects the work machine W, which has entered, for example, a lowest end portion of a cone-shaped infrared beam L corresponding to the detection range thereof. Beam L may be shaped like a gimlet. Then, during work, the control unit 40 regulates lifting of the work machine W in such a manner that a height of the work machine W is lower than the stored regulation height H.

In some embodiments, the regulation height of the work machine W is set to a position that may be obtained by lowering the work machine W by a predetermined distance (e.g., by 200 mm) after a worker manually operates the work machine lifting lever 71A (see FIG. 3) or the work machine lifting lever image 71B (see FIG. 4), as described above, to cause the work machine to be lifted and enter the detection range of the rear sensor. For example, the regulation height of the work machine W may be set to a position that is a predetermined distance away from the edge of the detection range of the rear sensor 22. The regulation height of the work machine W may be set to a position that is a predetermined distance away from a position of the work machine W after having entered the detection range of the rear sensor 22.

Further, the control unit 40 may have a "regulation height setting mode", in which setting of the regulation height of the work machine W is automatically performed. Further, when the regulation height setting mode is started, the control unit 40 makes it a condition that the work machine W is kept less than or equal to a predetermined height, thereby preventing the work machine W from entering the detection range of the rear sensor 22 from the start.

The control unit 40 may set priority for detecting obstacles before allowing regulation height setting mode to proceed. For example, if a starting instruction for the regulation height setting mode is received, for example, from a worker, the control unit 40 activates at least the rear sensor 22. Then, the control unit 40 may prevent detecting (e.g., measuring) a height of the work machine W while the rear sensor 22 performs detecting of an obstacle. If no obstacle is detected by the rear sensor 22 during a predetermined time, the control unit 40 starts detecting (e.g., measuring) a height of the work machine W.

Also, during the regulation height setting mode, if the rear sensor 22 detects an obstacle while the work machine W is being lifted, the control unit 40 stops lifting the work machine W and then stores a height of the work machine W at this time. Then, if the rear sensor 22 detects an obstacle when the work machine W is positioned at a height different from the stored height while the work machine W is being lowered, the control unit 40 stops detecting (e.g., measuring) a height of the work machine W. If an obstacle is detected while the work machine is being lowered, there is a possibility that an object other than the work machine has been detected. Therefore, it is possible to prevent mis-setting by stopping setting of the regulation height.

Also, the control unit 40 is configured to prohibit connection of a PTO clutch during the regulation height setting mode. If the PTO clutch is connected, then the work machine W is activated. Therefore, by prohibiting connection of the PTO clutch, safety can be enhanced.

Also, if the control unit 40 can communicate with the work machine W and thus identify the work machine W via communication, the control unit 40 may store the regulation height H set in association with the identification information. Further, for example, in a case where the work machine W has been replaced with another work machine W, if the control unit 40 finds a regulation height H stored in association with information for identification of the replaced work machine W when the control unit 40 starts communication with the newly replaced work machine W, the control unit 40 employs the regulation height H.

Figure 8A:
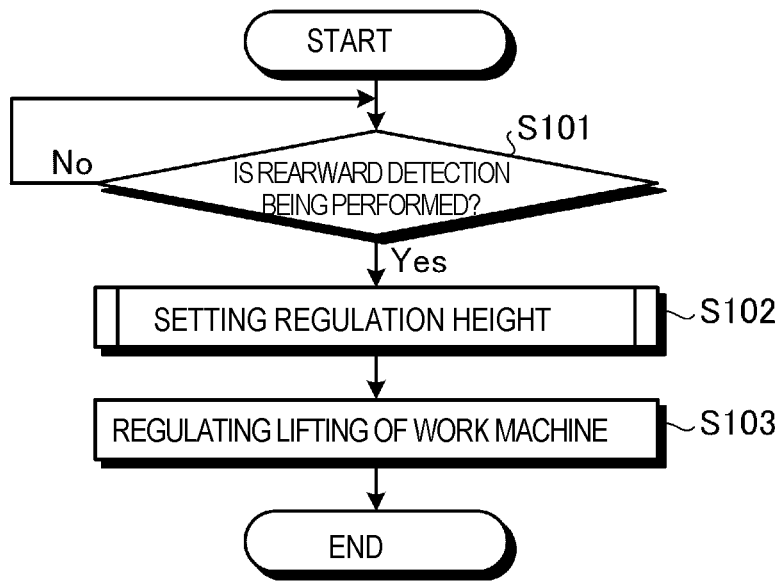
FIG. 8A is a flow chart showing an example of a process for regulating lifting of the work machine.
Figure 8B:
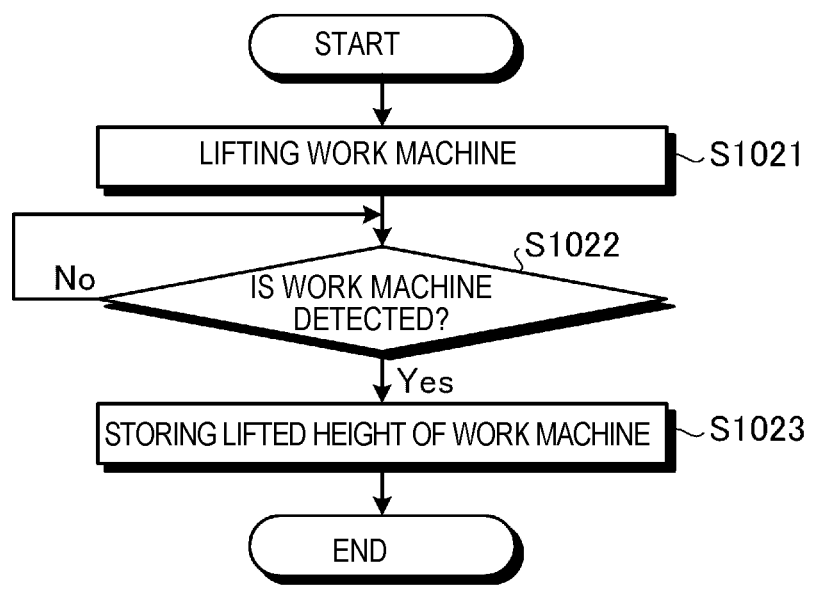
FIG. 8B is a flow chart showing an example of a process for setting a regulation height of the work machine.

Now, processes executed by the control unit 40 (see FIG. 2) for regulating lifting of the work machine W and also setting a regulation height of the work machine W will be respectively described with reference to FIGS. 8A and 8B. FIG. 8A is a flow chart showing an example of a process for regulating lifting of the work machine W. FIG. 8B is a flow chart showing an example of a process for setting a regulation height of the work machine W.

In the case of regulating lifting of the work machine W, as shown in FIG. 8A, the control unit 40 determines whether or not the rear sensor 22 is performing a rearward detection (Step S101). If it is determined that the rearward detection is being performed (Step S101: Yes), the control unit 40 sets a regulation height H of the work machine W (Step S102). Once the regulation height H of the work machine W has been set, the control unit 40 regulates lifting of the work machine W during work in accordance with the regulation height H. For example, the control unit 40 may regulate lifting of the work machine W in such a manner the height of the work machine W is kept less than or equal to the regulation height H (Step S103). If it is determined in the processing of Step S101 that the rearward detection is not being performed (Step S101: No), the control unit 40 repeats the processing until it is determined that the rearward detection is being performed.

In the case of setting a regulation height of the work machine W, as shown in FIG. 8B, the control unit 40 may lift the work machine W, for example, by manual operation by a worker (Step S1021). The control unit 40 determines whether or not the rear sensor 22 has detected the work machine W, which is being lifted (Step S1022). If it is determined that the work machine W has been detected (Step S1022: Yes), the control unit 40 stores a lifted height of the work machine W when the rear sensor 22 has detected the work machine W (Step S1023). The stored height of the work machine W may be used as the regulation height H. If it is determined in the processing of Step S1022 that the work machine W has not been detected (Step S1022: No), the control unit 40 repeats the processing until it is determined that the work machine W has been detected.

Due to such control, it may be possible to regulate lifting of the work machine W during work in such a manner that the work machine W is not lifted up to a height where the work machine W is mis-detected as an obstacle, thereby ensuring that the work can be smoothly performed. As a result, a decrease in work efficiency can be prevented.

Also, in the case of setting the regulation height of the work machine W, the control unit 40 may lift the work machine W a plurality of times (e.g., three times) and then set the regulation height H based on results of detection by the rear sensor. The results may be obtained by performing trial lifting of the work machine W a plurality of times. For example, during setting of the regulation height of the work machine W, the regulation height may be mis-set if the rear sensor 22 detects an obstacle due to causes other than detection of the work machine W. Therefore, due to the above control, it is possible to prevent the regulation height from being mis-set by performing trial lifting of the work machine W a plurality of times.

Further, in some embodiments, if the results of detection by the rear sensor 22 which are obtained by performing trial lifting of the work machine W a plurality of times have variations beyond a predetermined range, the control unit 40 stops setting the regulation height. During setting of the regulation height of the work machine W, if the results of detection by the rear sensor 22 which are obtained by performing trial lifting of the work machine W a plurality of times have variations, there may be a high possibility that the rear sensor 22 detects an obstacle due to causes other than detection of the work machine W. Therefore, with the above control, it may be possible to stop setting the regulation height of the work machine W in such a case, thereby preventing mis-setting of the regulation height H.

In this case, measuring of the height may be repeatedly performed until the variations are eliminated. In some embodiments, measuring of the height may be repeatedly performed until the variations fall within the predetermined range. If the variations fall within the predetermined range, then measuring of the height is ended. Further, the control unit 40 determines a mean value of measured values obtained by lifting a plurality of times and then sets the mean value as a reference value for the regulation height H.

Also, in the tractor 1 as described above, the control unit 40 may control a pivot angle of the lift arm 122 to lift or lower the work machine W, thereby allowing lifting control of the work machine W to be simply realized. Further, in the tractor 1 as described above, the rear sensor 22 can monitor the environment behind the machine body even in the case of the autonomous operation mode, thereby enhancing safety. Further, since the rear sensor 22 may be an infrared sensor, the rear sensor 22 can detect a distance to an obstacle, thereby allowing the obstacle to be detected with high accuracy.

Figure 9A:
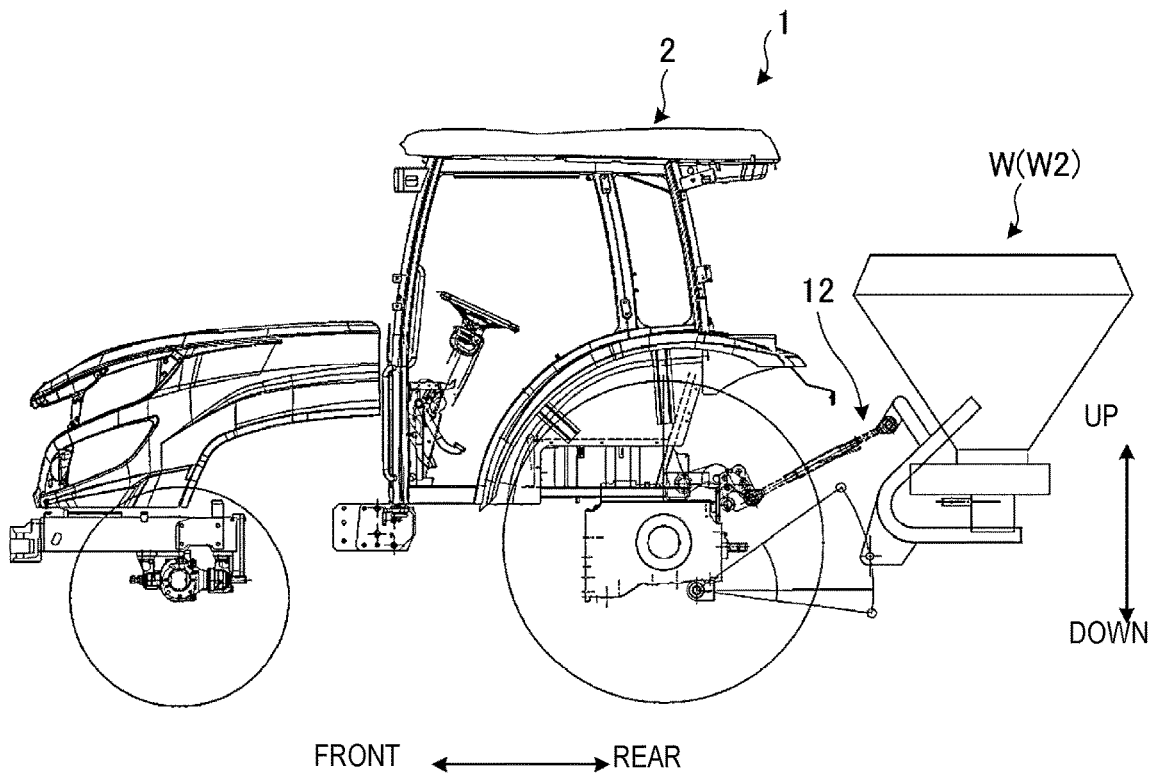
FIG. 9A is an explanatory view of another type of work machine (Part 1)
Figure 9B:
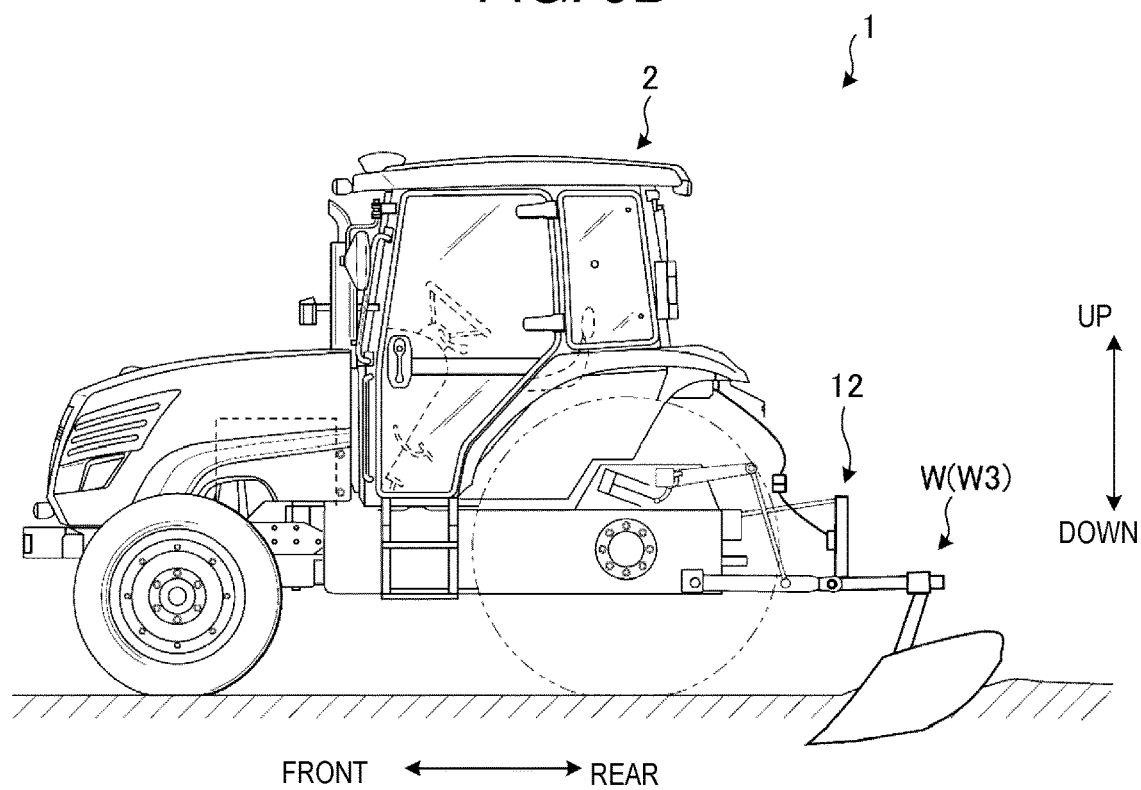
FIG. 9B is an explanatory view of another type of work machine (Part 2)

FIGS. 9A to 9C are explanatory views of other types of work machine W (work machines W2 to W4). The work machine W mounted on the travelling vehicle body 2 is not limited to the rotary tiller W1 (see FIG. 1) as described above. As examples of other types of work machines W, FIG. 9A shows a broadcaster W2, FIG. 9B shows a plow W3 and FIG. 9C shows a reversible plow W4.

The broadcaster W2 shown in FIG. 9A may be intended to perform a work of spraying materials, such as fertilizer, on a farm field. The plow W3 shown in FIG. 9B may be intended to perform a work of plowing a farm field. Also, the reversible plow W4 shown in FIG. 9C may be intended to perform a work of plowing a farm field and is used by turning it upside down between forward travelling and return travelling during a reciprocating travel. For the reversible plow W4 as shown in FIG. 9C, if adjacent works continue in the autonomous operation mode, when the machine body is turned, the control unit 40 may perform control to turn the reversible plow W4 upside down by moving an outside hydraulic system at the same time as the travelling vehicle body 2 is turned. As a result, it is possible to perform work during autonomous travel.

In addition, in a case where a wing harrow is mounted as the work machine W, a width of the wing harrow in the left and right direction may be longer than a width of the travelling vehicle body 2 in the left and right direction. Therefore, in order to prevent the travelling vehicle body 2 from stopping due to detection of the wing harrow by the rear sensor 22 when the machine body is turned, the control unit 40 may perform a control to retract the wing harrow so that the wing harrow does not enter the detection range of the rear sensor 22 by stopping an outside hydraulic system during the autonomous operation system. As a result, it is possible to perform work during autonomous travel.

Figure 10A:
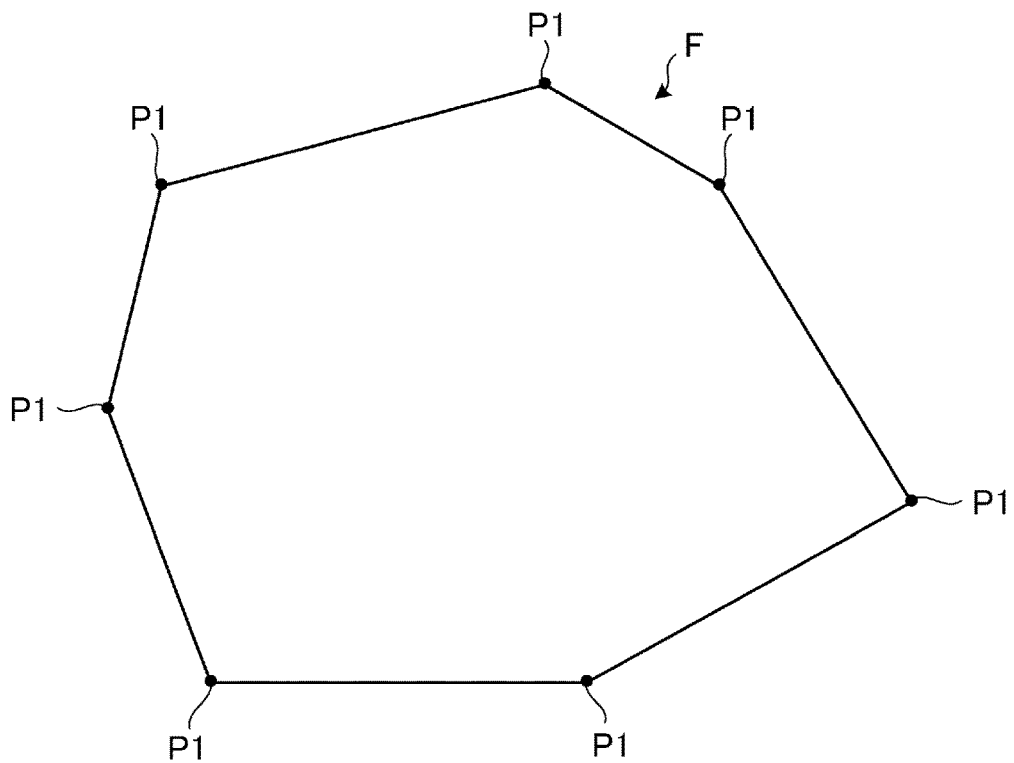
FIG. 10A is an explanatory view of a mapping control (Part 1)
Figure 10B:
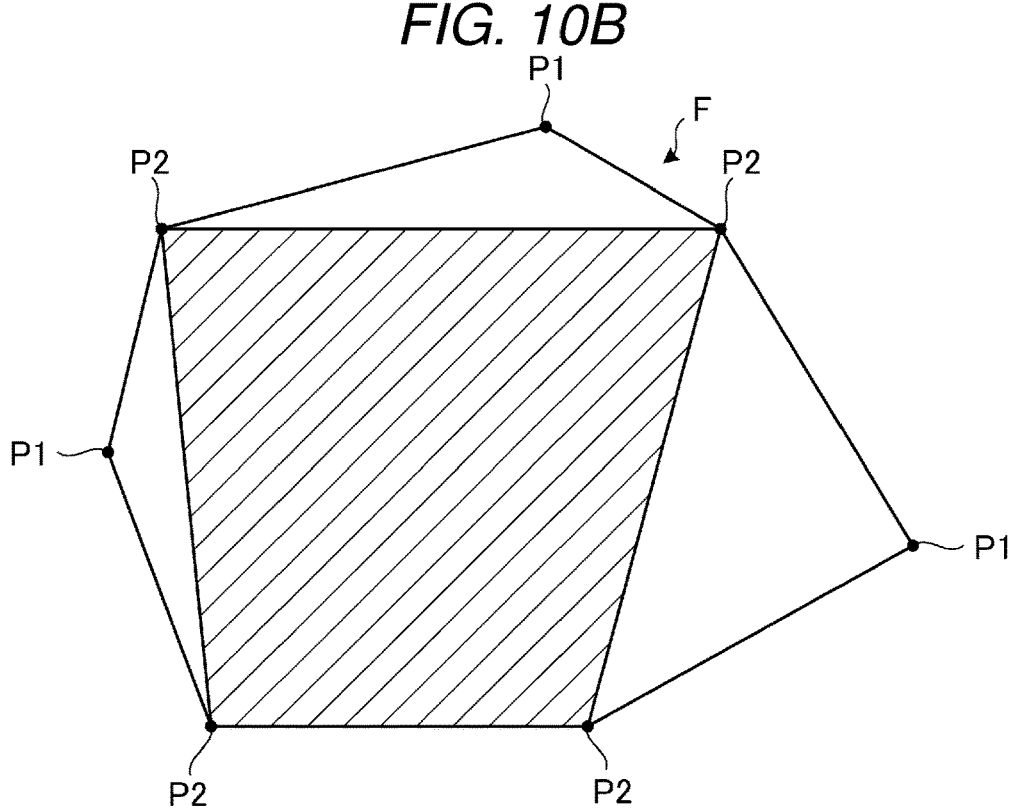
FIG. 10B is an explanatory view of the mapping control (Part 2)

FIGS. 10A and 10B are explanatory views of a mapping control. For the autonomously travelling tractor 1, when mapping a farm field F, the control unit 40 (see FIG. 2) registers therein a plurality of outer peripheral points P1 as shown in FIG. 10A and then sets a travelling route for autonomous travel by selecting a predetermined number of selected points P2 (e.g., four selected points) from the registered outer peripheral points P1 as shown in FIG. 10B. In this case, the control unit 40 selects four points P2 in such a manner that an area defined by the selected four points P2 is largest within the registered outer peripheral points P1.

Second Embodiment

Figure 11:
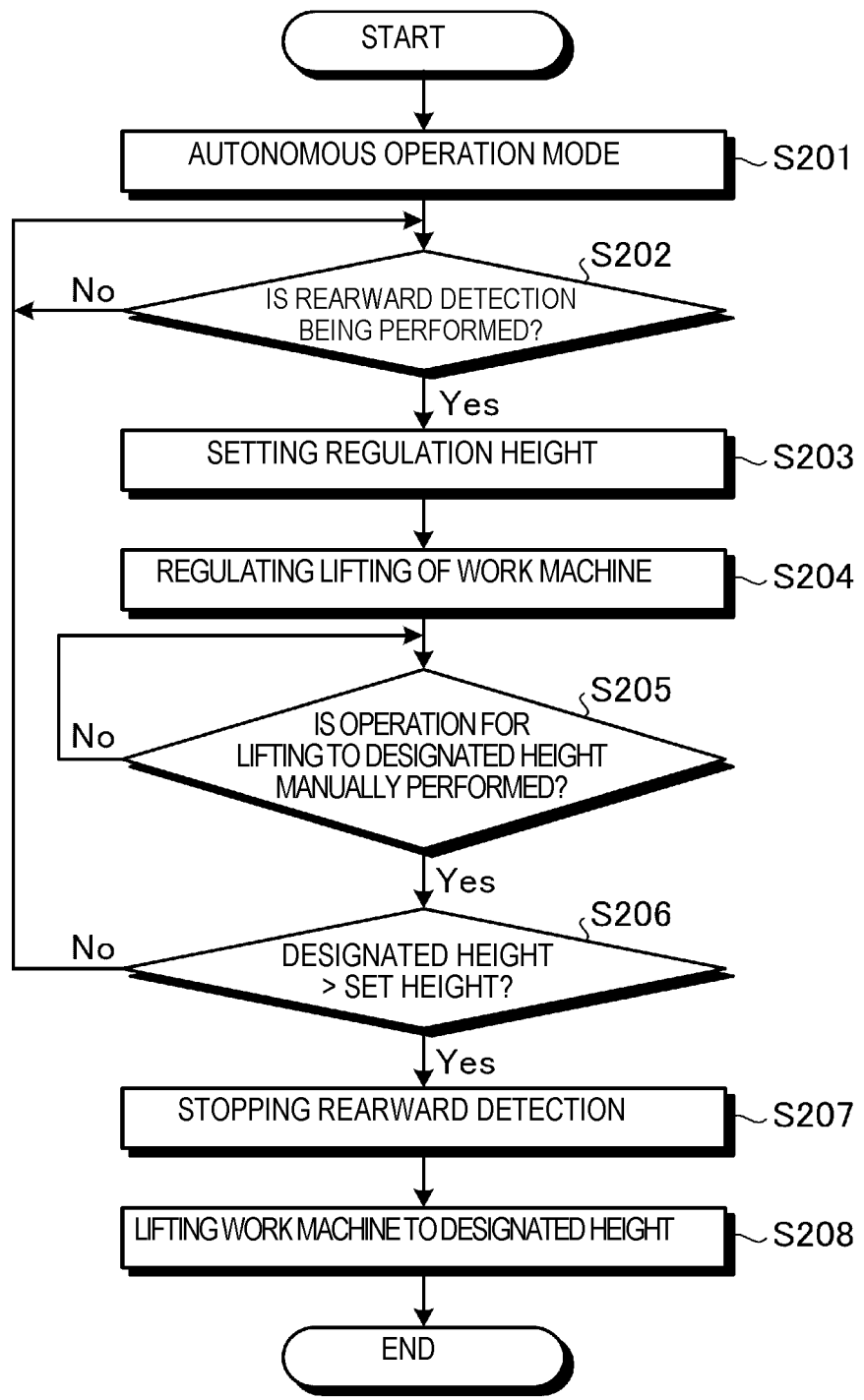
FIG. 11 is a flow chart showing an example of a process of performing a rearward detection in a work vehicle according to a second embodiment.

Next, a work vehicle (tractor) according to a second embodiment will be described with reference to FIG. 11. FIG. 11 is a flow chart showing an example of a process of performing a rearward detection in the work vehicle (tractor) according to the second embodiment. The second embodiment as described below may be different from the work vehicle (tractor) 1 according to the first embodiment as described above, in that the second embodiment includes a control in a case where lifting and lowering of the work machine W is manually operated.

In the second embodiment, during the autonomous operation mode, if after a regulation height H (see FIG. 7B) of the work machine W has been set, a worker manually operates the work machine height manual designation means 71, e.g., either the work machine lifting lever 71A (see FIG. 3) or the work machine lifting lever image 71B (see FIG. 4) during work in order to lift the work machine W to a position higher than the regulation height H, the control unit 40 lifts the work machine W to the designated height and also stops detection by the rear sensor 22.

As shown in FIG. 11, during the autonomous operation mode (Step S201), the control unit 40 determines whether or not the rear sensor 22 is performing a rearward detection (Step S202). If it is determined that the rearward detection is being performed (Step S202: Yes), the control unit 40 sets a regulation height H of the work machine W (Step S203). Once the regulation height H of the work machine W has been set, the control unit 40 regulates lifting of the work machine W during work in such a manner that height of the work machine W is kept less than or equal to the regulation height H (Step S204). If it is determined in the processing of Step S202 that the rearward detection is not being performed (Step S202: No), the control unit 40 repeats the processing until it is determined that the rearward detection is being performed.

Then, the control unit 40 determines whether or not an operation for lifting the work machine W to a designated height has been performed by manual operation (Step S205). The manual operation may include using either the work machine lifting lever 71A or the work machine lifting lever image 71B, which are examples of the work machine height manual designation means 71. If it is determined that the operation for lifting the work machine W to the designated height has been performed by manual operation (Step S205: Yes), the control unit 40 determines whether or not the designated height is higher than a set height (regulation height H) (Step S206). If the designated height is higher than the set height (Step S206: Yes), the control unit 40 stops the rearward detection (Step S207) and then lifts the work machine W to the designated height (Step S208).

If it is determined in the processing of Step S205 that the operation for lifting the work machine W to the designated height has not been performed by manual operation (Step S205: No), the control unit 40 repeats the processing until it is determined that the operation for lifting the work machine W to the designated height has been performed by manual operation. Also, if it is determined in the processing of Step S206 that the designated height is lower than the set height (Step S206: No), the control unit 40 returns, for example, to the processing for determining the rearward detection.

When a height of the work machine W is manually designated by a worker or the like, it is preferable to lift the work machine W to a height desired by the worker or the like. Priority may be given to allowing the work machine W to be lifted to the height desired by the worker, rather than detecting obstacles. Therefore, due to the above control, it is possible to stop detection by the rear sensor 22 when a height of the work machine W is manually designated by a worker or the like, thereby preventing mis-detection by the rear sensor 22 and thus ensuring that the work can be smoothly performed. As a result, a decrease in work efficiency can be prevented.

Also, even when the work machine W is lifted by the work machine height manual designation means 71 (work machine lifting lever 71A or work machine lifting lever image 71B), the control unit 40 continues autonomous travel of the travelling vehicle body 2. That is, the autonomous operation mode is continued. Lifting of the work machine W by the work machine lifting lever 71A or the work machine lifting lever image 71B is the intention of the worker. Accordingly, it is considered that safety is ensured under monitoring of the worker. Therefore, due to the above control, it is possible to continue the autonomous operation mode, thereby preventing a decrease in work efficiency.

Further, when the work machine W is lowered by manual operation, the control unit 40 stops the autonomous travel if the work machine is detected at a height less than or equal to the regulation height H. Further, when the work machine W is lifted by manual operation and the rear sensor 22 is disabled, the control unit 40 regulates backward movement of the travelling vehicle body 2. Further, when the work machine W is lifted by manual operation and the rear sensor 22 is disabled, the control unit 40 regulates connection of the PTO clutch. Further, when starting lifting of the work machine W is detected, the control unit 40 stops the control of detecting an obstacle by the rear sensor 22.

Also, as described above, the control unit 40 controls a pivot angle of the lift arm 122 (see FIG. 1) based on the result of detection by the lift arm sensor 26 (see FIG. 1), thereby lifting or lowering the work machine W. As a result, it is possible to realize lifting control of the work machine W simply and efficiently.

Third Embodiment

Figure 12:
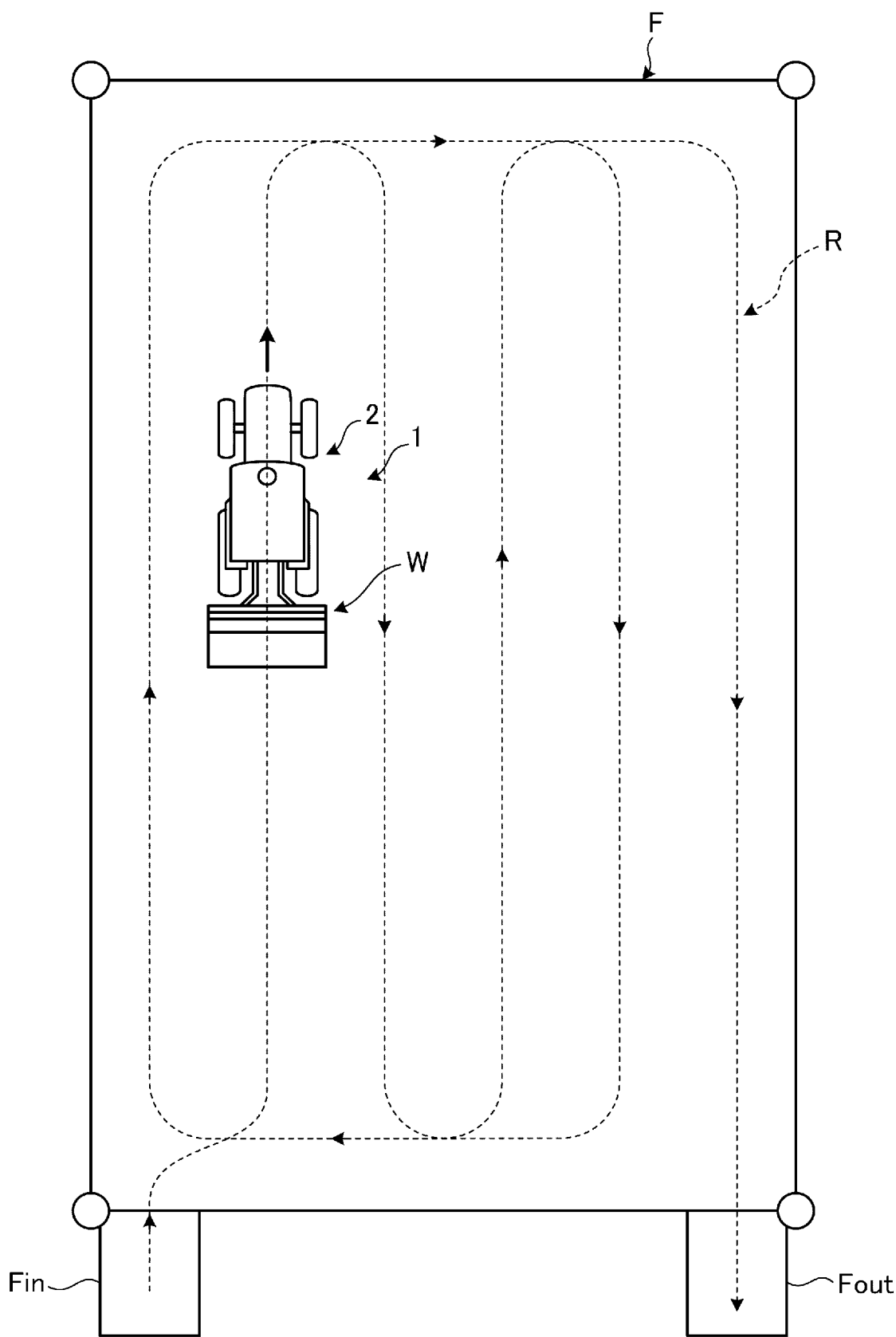
FIG. 12 is an explanatory view of turning during autonomous travel in a work vehicle according to a third embodiment.
Figure 13:
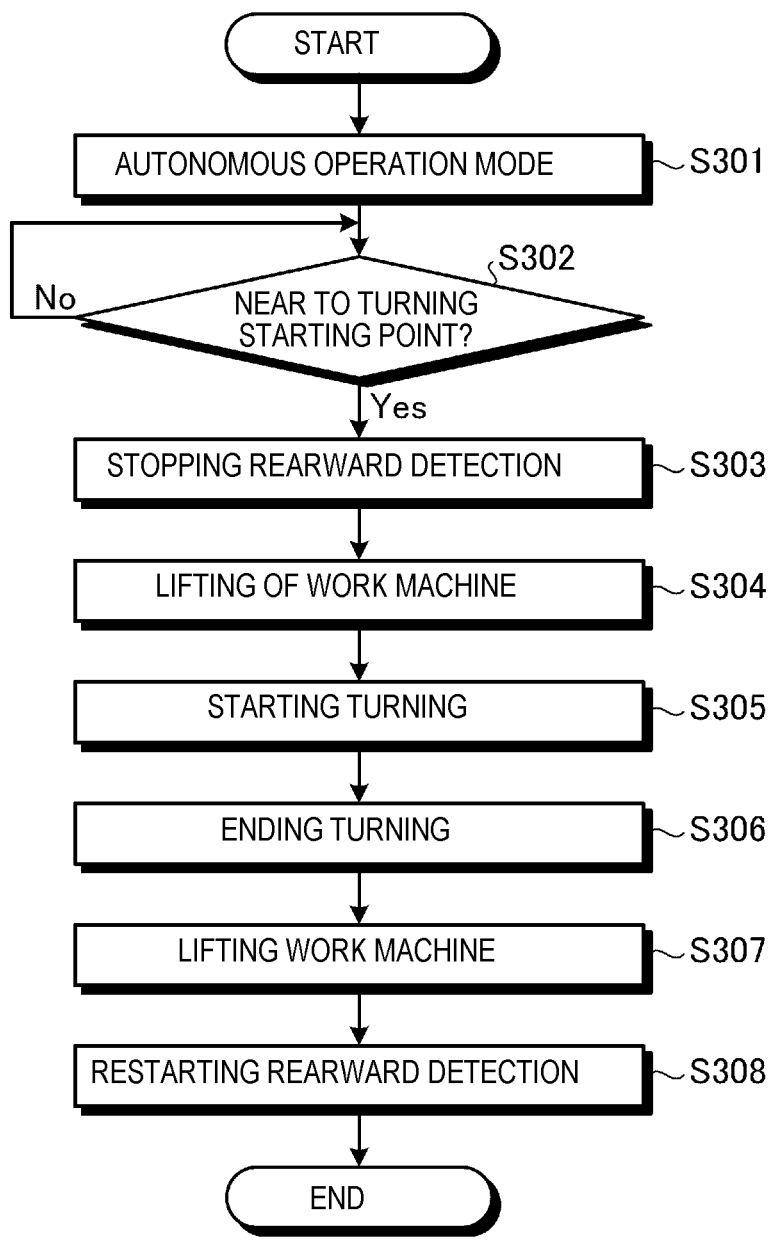
FIG. 13 is a flow chart showing an example of a process of performing a rearward detection in a work vehicle according to a third embodiment.

Next, the work vehicle (tractor) 1 according to a third embodiment will be described with reference to FIGS. 12 and 13. FIG. 12 is an explanatory view of turning during autonomous travel of the work vehicle (tractor) 1 according to the third embodiment. FIG. 13 is a flow chart showing an example of a process of performing a rearward detection in the work vehicle (tractor) 1 according to the third embodiment. Meanwhile, the third embodiment as described below may be different from the first and second embodiments as described above, in that an area may be set in which a rearward detection is not performed.

As shown in FIG. 12, the tractor 1 enters a farm field F through an entrance Fin of the farm field F along a planned travelling route R, and then automatically performs work while suitably turning and travelling. In addition, depending on programs, it is possible to control the tractor 1 in such a manner that after work, the tractor 1 comes out of the farm field F through an exit $F_{out}$ of the farm field F and stops at a predetermined location.

Meanwhile, when setting the planned travelling route R, the control unit 40 (see FIG. 2) may be configured to measure the farm field F by causing the tractor 1 (travelling vehicle body 2) to travel from an end portion of the farm field F one time in a transverse direction and then one time in a longitudinal direction. By acquiring four points corresponding to four corners of the farm field F, the control unit 40 may calculate the planned travelling route R based on the measured results.

The tractor 1 (travelling vehicle body 2) performs work by moving straight in the farm field F and then by repeatedly turning and again moving straight when reaching the vicinity of ridges (end edges of the farm field F). Upon turning, the tractor 1 starts turning at a turning starting point and ends turning at a turning ending point. The control unit 40 may have previously set the turning starting points and the turning ending points on the planned travelling route R in accordance with the entire length or entire width of the tractor 1 (e.g., including the travelling vehicle body 2 and work machine W) and capability of the machine body (e.g., a minimum turning radius).

In the third embodiment, the control unit 40 sets an area in which the rearward detection is not performed during the autonomous operation mode. Specifically, if the travelling vehicle body 2 approaches a location where it has to turn, the control unit 40 stops the rearward detection performed by the rear sensor 22. Alternatively, the control unit 40 may execute a control for stopping the rearward detection performed by the rear sensor 22 after starting turning of the travelling vehicle body 2 is detected.

As shown in FIG. 13, during the autonomous operation mode (Step S301), it is determined whether or not the travelling vehicle body 2 has reached the vicinity of a preset turning starting point (Step S302). If it is determined that the travelling vehicle body 2 has reached the vicinity of the turning starting point (Step S302: Yes), the control unit 40 stops the rearward detection performed by the rear sensor 22 (Step S303), lifts the work machine W (Step S304) and then starts turning the travelling vehicle body 2 (Step S305).

Next, the control unit 40 stops turning (Step S306), lowers the work machine (Step S307) and restarts the rearward detection performed by the rear sensor (Step S308). If it is determined in the processing of Step S302 that the travelling vehicle body 2 has not reached the vicinity of the turning starting point (Step S302: No), the control unit 40 repeats the processing until it is determined that the travelling vehicle body 2 has reached the vicinity of the turning starting point.

Due to this control, the work machine W is automatically lifted upon turning and also the detection performed by the rear sensor 22 is stopped upon turning. Therefore, it is possible to prevent the rear sensor 22 from detecting the work machine W as an obstacle, thereby ensuring that the work can be smoothly performed. As a result, a decrease in work efficiency can be prevented.

Also, as described above, the control unit 40 stores as a regulation height H (see FIG. 7B) a height where the rear sensor 22 detects the work machine W while the work machine W is lifted, and then regulates lifting of the work machine W during work in such a manner that a height of the work machine W is kept less than or equal to the stored regulation height H. Due to this control, it is possible to regulate lifting of the work machine W during work in such a manner that the work machine W is not lifted up to a height where the work machine W is mis-detected as an obstacle, thereby ensuring that the work can be smoothly performed. As a result, a decrease in work efficiency can be prevented.

Also, as described above, the control unit 40 controls a pivot angle of the lift arm 122 (see FIG. 1) based on the result of detection by the lift arm sensor 26 (see FIG. 1), thereby lifting or lowering the work machine W. As a result, it is possible to realize lifting control of the work machine W simply and efficiently.

Further, the control unit 40 may execute the control for stopping the rearward detection performed by the rear sensor 22 upon turning, if it is recognized that a type of work machine, which has to be lifted upon turning, is mounted.

Fourth Embodiment

Figure 14:
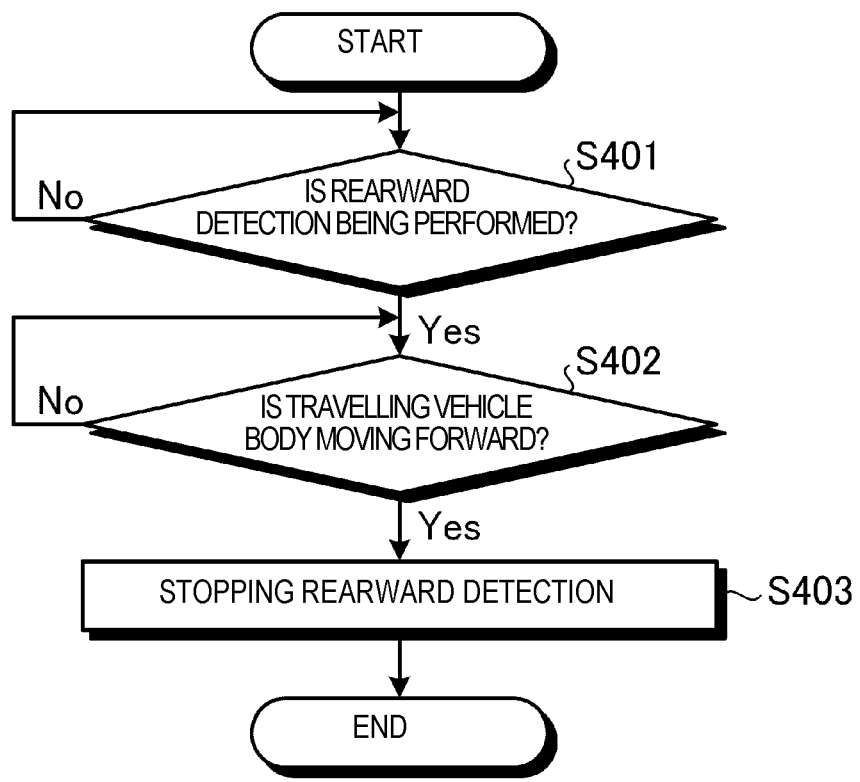
FIG. 14 is a flow chart showing an example of a process of performing a rearward detection in a work vehicle according to a fourth embodiment.

Next, a work vehicle (tractor) according to a fourth embodiment will be described with reference to FIG. 14. FIG. 14 is a flow chart showing an example of a process of performing a rearward detection in the work vehicle (tractor) according to the fourth embodiment. Meanwhile, the fourth embodiment as described below may be different from the first to third embodiments as described above, in that a rearward detection is not performed during moving forward.

In the fourth embodiment, the control unit 40 stops the detection performed by the rear sensor 22 (see FIG. 1) if the travelling vehicle body 2 (see FIG. 1) is moving forward during the autonomous operation mode.

As shown in FIG. 14, for example, during the autonomous operation mode, the control unit 40 determines whether or not the rear sensor 22 is performing a rearward detection (Step S401). If it is determined that the rearward detection is being performed (Step S401: Yes), the control unit 40 determines whether or not the travelling vehicle body 2 is moving forward (Step S402). If it is determined that the travelling vehicle body is moving forward (Step S402: Yes), the control unit 40 stops the rearward detection performed by the rear sensor 22.

If it is determined in the processing of Step S401 that the rearward detection is not being performed (Step S401: No), the control unit 40 repeats the processing until it is determined that the rearward detection is being performed. If it is determined in the processing of Step S402 that the travelling vehicle body 2 is not moving forward (Step S402: No), the control unit 40 repeats the processing until it is determined that the travelling vehicle body is moving forward.

When the travelling vehicle body 2 is moving forward, there is a less need to monitor the environment behind the travelling vehicle body 2. Therefore, due to the above control, it is possible to stop detection by the rear sensor when the travelling vehicle body 2 is moving forward, thereby preventing the rear sensor 22 from detecting the work machine as an obstacle. As a result, the work can be smoothly performed. As a result, a decrease in work efficiency can be prevented.

Also, as described above, the control unit 40 controls a pivot angle of the lift arm 122 (see FIG. 1) based on the result of detection by the lift arm sensor 26 (see FIG. 1), thereby lifting or lowering the work machine W. As a result, it is possible to realize lifting control of the work machine W simply and efficiently.

Also, as described above, the control unit 40 is configured to store a planned travelling route R (see FIG. 12) of the travelling vehicle body 2. The control unit 40 may have an autonomous operation mode in which the tractor performs work while autonomously travelling along the planned travelling route R based on measurement results of the positioning device 30 (see FIG. 1). As a result, it is possible to monitor the environment behind the machine body even in the case of the autonomous operation mode, thereby enhancing safety.

Also, if the travelling vehicle body 2 has to start moving backward, the control unit 40 preferably performs the rearward detection using the rear sensor 22 from a predetermined time before starting moving backward. Further, if the work machine W has to be lowered, the control unit 40 preferably performs a rearward detection using the rear sensor 22 from a predetermined time before lowering the work machine W. Further, even if the PTO clutch has to be connected, the control unit 40 preferably performs the rearward detection using the rear sensor 22 from a predetermined time before connecting the PTO clutch.

Further effects and variants can be easily derived by those skilled in the art. Therefore, broader aspects of the present invention are not limited to the specific details and representative embodiments as shown and described above. Accordingly, various modifications can be made without departing from the spirit or scope of the general inventive concept as may be defined by the appended claims and equivalents thereof.

What is claimed is:

1. A work vehicle comprising:
a travelling vehicle body;
a work machine mounted on a rear portion of the travelling vehicle body configured to be lifted and lowered;
a control unit configured to control lifting and lowering of the work machine; and
a rear sensor provided on the rear portion of the travelling vehicle body and configured to detect an object behind the travelling vehicle body, wherein
the control unit is configured to:
set a regulation height based on a height where the rear sensor detects the work machine while the work machine is lifted, and regulate lifting of the work machine during work in such a manner that a height of the work machine is kept less than or equal to the regulation height, wherein the control unit is configured to, during an autonomous operation mode, determine whether or not the travelling vehicle body has reached a vicinity of a turning start point, and in response to determining that the travelling vehicle body has reached the vicinity of the turning start point, stop rearward detection by the rear sensor, lift the work machine, and start turning the travelling vehicle body.

2. The work vehicle according to claim 1, wherein the control unit is configured to set the regulation height based on results of detection by the rear sensor obtained by performing trial lifting of the work machine a plurality of times.

3. The work vehicle according to claim 2, wherein the control unit is configured to stop setting the regulation height if there are variations beyond a predetermined range in the results of detection by the rear sensor obtained by performing trial lifting of the work machine the plurality of times.

4. The work vehicle according to claim 2, wherein the control unit is configured to repeatedly perform trial lifting until variations in the results of detection by the rear sensor are reduced to within a predetermined range.

5. The work vehicle according to claim 1, further comprising:
a lift arm provided on the rear portion of the travelling vehicle body and configured to lift and lower the work machine by pivoting about a fulcrum; and
a lift arm sensor for detecting a pivot angle of the lift arm about the fulcrum,
wherein the control unit is configured to control the pivot angle of the lift arm based on results of detection by the lift arm sensor to lift and lower the work machine.

6. The work vehicle according to claim 1, wherein the control unit is configured to set the regulation height as a position that is a predetermined distance away from a position where the rear sensor detects the work machine while the work machine is lifted.

7. The work vehicle according to claim 1, wherein the control unit is configured to prevent setting the regulation height until after a predetermined time passes during which no object is detected by the rear sensor.

8. The work vehicle according to claim 1, wherein the control unit is configured to store the regulation height in association with identification information of the work machine.

9. A work vehicle comprising:
a travelling vehicle body;
a work machine mounted on a rear portion of the travelling vehicle body configured to be lifted and lowered;
a control unit configured to control lifting and lowering of the work machine; and
a rear sensor provided on the rear portion of the travelling vehicle body and configured to detect an object behind the travelling vehicle body, wherein the control unit is configured to:
set a regulation height based on a height where the rear sensor detects the work machine while the work machine is lifted, and regulate lifting of the work machine during work in such a manner that a height of the work machine is kept less than or equal to the regulation height, wherein the control unit is configured to, during an autonomous operation mode,
determine whether or not the rear sensor is performing a rearward detection,
determine whether or not the travelling vehicle body is moving forward, and
in response to determining that the rearward detection is being performed and the travelling vehicle body is moving forward, stop the rearward detection.

10. The work vehicle according to claim 9, wherein the control unit is configured to set the regulation height based on results of detection by the rear sensor obtained by performing trial lifting of the work machine a plurality of times.

11. The work vehicle according to claim 10, wherein the control unit is configured to stop setting the regulation height if there are variations beyond a predetermined range in the results of detection by the rear sensor obtained by performing trial lifting of the work machine the plurality of times.

12. The work vehicle according to claim 10, wherein the control unit is configured to repeatedly perform trial lifting until variations in the results of detection by the rear sensor are reduced to within a predetermined range.

13. The work vehicle according to claim 9, further comprising:
a lift arm provided on the rear portion of the travelling vehicle body and configured to lift and lower the work machine by pivoting about a fulcrum; and
a lift arm sensor for detecting a pivot angle of the lift arm about the fulcrum,
wherein the control unit is configured to control the pivot angle of the lift arm based on results of detection by the lift arm sensor to lift and lower the work machine.

14. The work vehicle according to claim 9, wherein the control unit is configured to set the regulation height as a position that is a predetermined distance away from a position where the rear sensor detects the work machine while the work machine is lifted.

15. The work vehicle according to claim 9, wherein the control unit is configured to prevent setting the regulation height until after a predetermined time passes during which no object is detected by the rear sensor.

16. The work vehicle according to claim 9, wherein the control unit is configured to store the regulation height in association with identification information of the work machine.

\* \* \* \* \*